Feb. 20, 1968  W. C. SCHMITT ET AL  3,369,566
SINGLE LEVER MIXING FAUCET
Filed Sept. 20, 1965  2 Sheets-Sheet 1
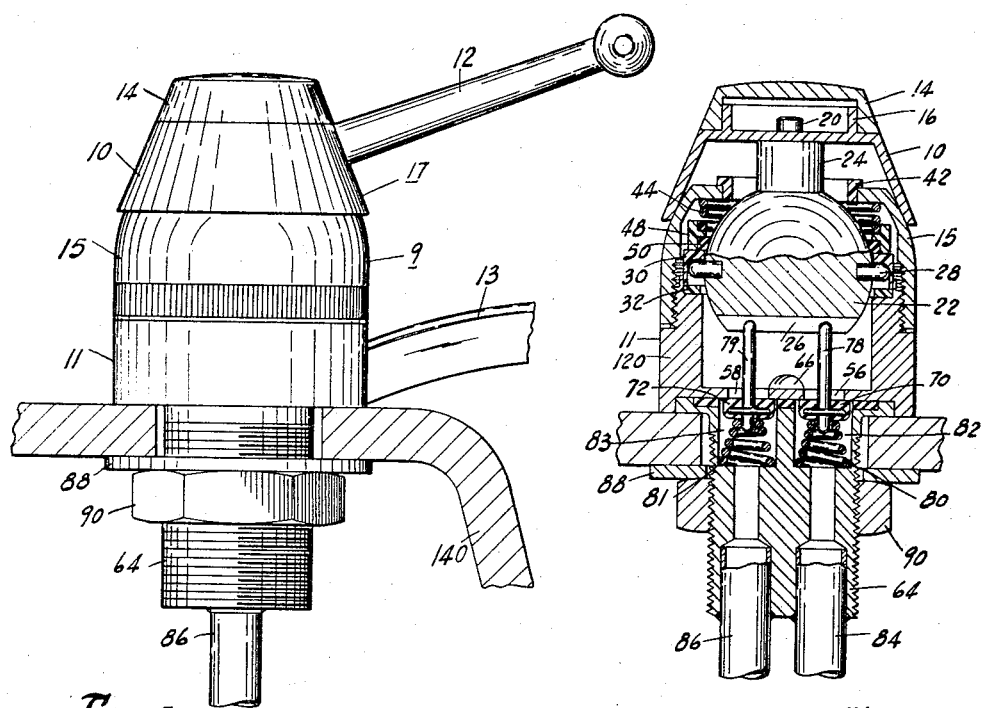
Fig. 1
Fig. 8
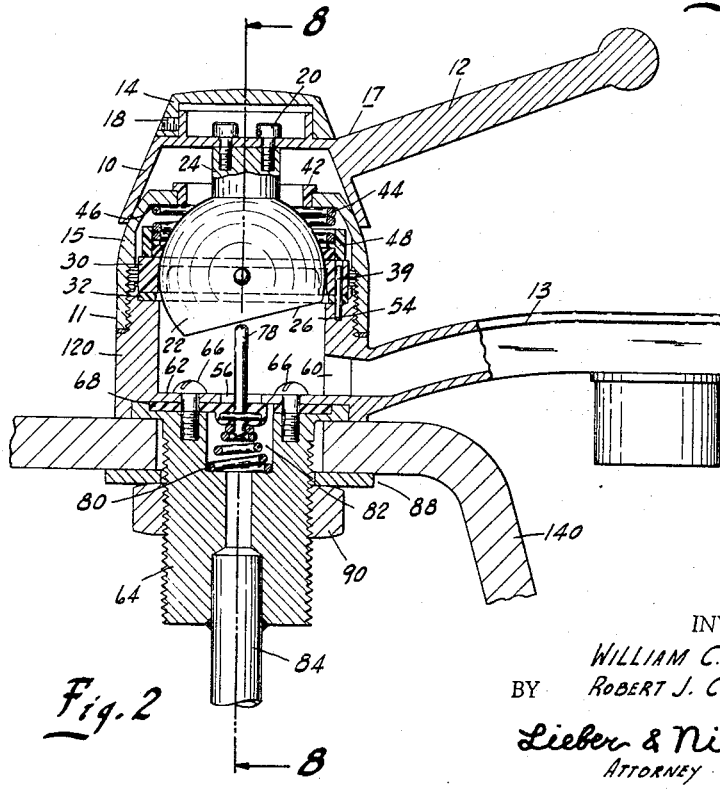
Fig. 2
INVENTOR.
WILLIAM C. SCHMITT
BY ROBERT J. CORDIE
Lieber & Nilles
ATTORNEY

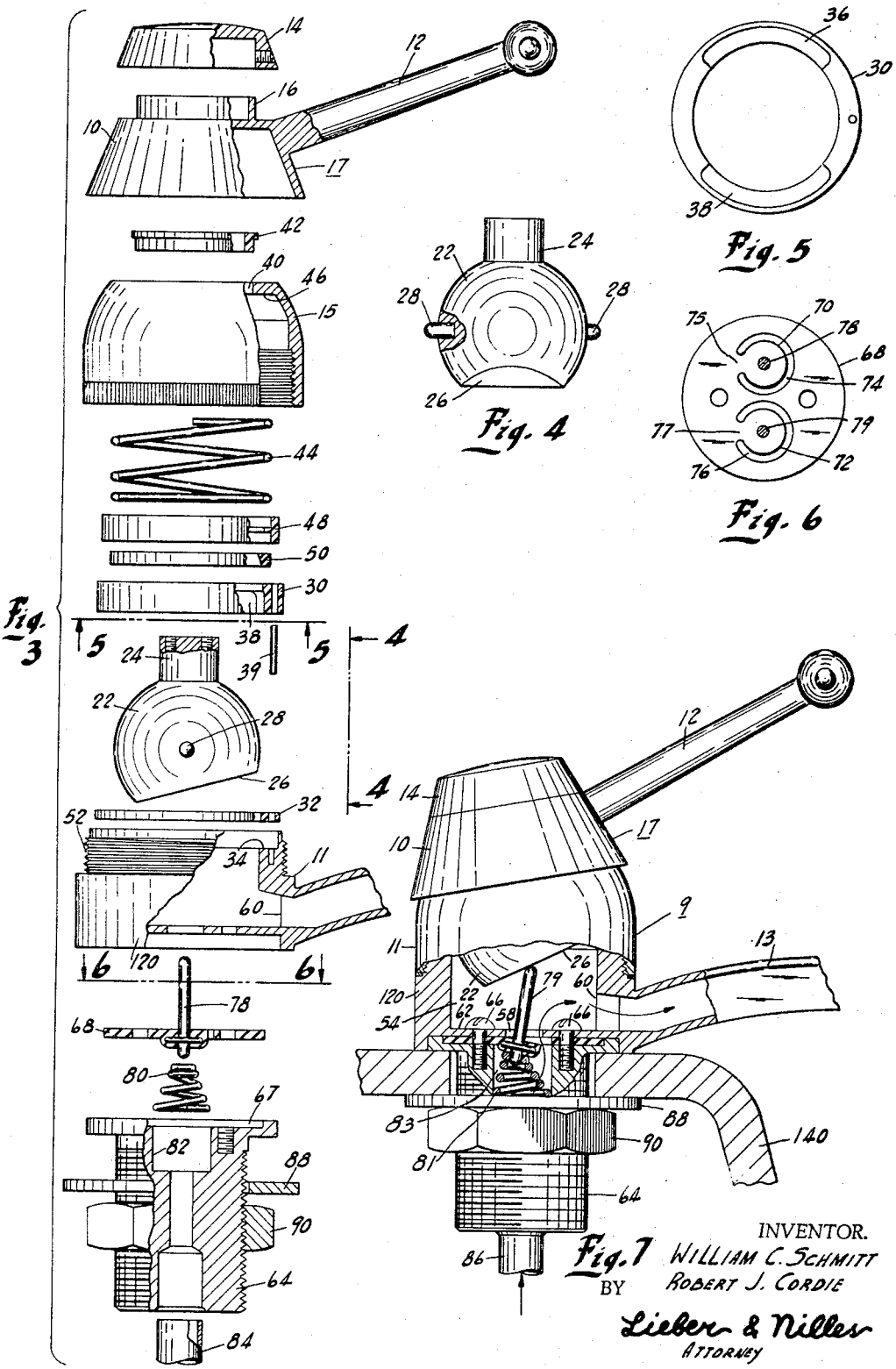

United States Patent Office 3,369,566
Patented Feb. 20, 1968

3,369,566
SINGLE LEVER MIXING FAUCET
William C. Schmitt and Robert J. Cordie, Milwaukee, Wis., assignors, by mesne assignments, to Milwaukee Faucets, Inc., a corporation of Delaware
Filed Sept. 20, 1965, Ser. No. 488,389
10 Claims. (Cl. 137—636.1)

This invention relates to mixing faucets. More particularly this invention relates to an improved hot and cold water mixing faucet operated by a single lever and having the valve formed as an integral part of a flexible membrane.

Mixing faucets of this type with which this invention is concerned employ a single operating lever to selectively open either one or both of the hot or cold water inlets to varying degrees by shifting the valve means normally blocking the inlet parts off of their respective seats. The faucet contains a mixing chamber which combines the water from the hot and cold water supply inlets and provides water of varying desired temperatures to the outlet or spout of the faucet.

Single lever mixing faucets have, in fact, become quite popular due to the convenience of operation thereof as facilitated by the use of a single lever to temper and properly mix the water emanating from a single faucet spout. The single lever faucets most commonly employed in the past have embodied valves of the poppet type which are linearly movable in a straight line toward and away from their seats in order to open and close the same. However, the poppet type valves thus employed require actuators which are accurately guided in their movement so that the valves will be properly seated when closed, and cages have also been required in some instances for preventing complete displacement of the valves during actuation. It has heretofore been common practice to actuate valves of this type by means of a cam which is controlled by a single operating lever.

These prior single lever mixing faucet assemblages employing valves of the poppet type adapted to move to and from their valve seats linearly or in a straight line motion have therefore posed various problems. First, the requirements for guides and/or cages has resulted in undesirably high cost in the production of these devices. The mechanisms are moreover undesirably complicated and are furthermore subjected to considerable wear thus resulting in the need for frequent replacement and/or repair. Not only do these prior valve assemblages require an excessive number of parts which are costly to manufacture, but they are also difficult to assemble, particularly in view of the care which must be exercised in order to assure proper operation.

In efforts to overcome some of these disadvantages of single lever mixing faucets employing valves of the poppet type, and in an effort to simplify the assemblages and reduce the number of parts requiring machining and assembly, it has also been heretofore proposed to employ valve structures which include a diaphragm adapted to be flexed in order to selectively open and close either one or both hot and cold water inlets. While valve assemblages employing such a diaphragm have reduced the number of essential working parts, thus simplifying the resultant structure, numerous disadvantages are still, nevertheless, present in such devices.

For example, a fundamental criterion of any plumbing fixture, such as a faucet, is that it operate for extended periods of time without attention or maintenance and that it operate easily and without leakage. It may be noted that in prior valves of the diaphragm type the diaphragm is used to both open and close the water inlets and to seal the operative parts of the faucet from water passing therethrough. Accomplishment of this dual function places excessive demands on the diaphragm thus causing stretching and distortion which leads to rapid failure.

Furthermore, in order to both seal the operative parts of the faucet and open and close the water inlets, the diaphragm in these prior devices has generally been positioned so that the pressure of the incoming water tends to lift the diaphragm off the seats and open the inlets. To close the inlets the diaphragm must then be pushed tightly against the valve seat by the mechanical parts of the faucet to overcome the water pressure and seal against the incoming water. This causes wear on the diaphragm due to the fact that both opening and closing pressures are applied by the faucet parts coupled with the fact that the water pressure acts on and against the diaphragm at the valve seats. Also, considerable wear is caused by the stretching and distortion which takes place when one water inlet is opened and the other is closed. All of the foregoing causes rapid deterioration of the diaphragm portion of the faucet requiring frequent replacement and other maintenance. Also, faucets of this type are objectionably hard to operate and are subject to frequent leakage problems.

It is, therefore, an object of this invention to furnish an improved single lever faucet which is of extremely simple construction and which nevertheless is adapted to render substantially trouble-free service for substantial periods of time.

It is a further object of this invention to provide a greatly simplified single lever faucet having an improved valve mechanism which includes a diaphragm or membrane provided with integral flaps adapted to be opened against the pressure of the water and closed with the aid of such water pressure to thereby minimize the possibility of leakage as well as stretching or distortion of the valve forming member during operation of the faucet.

Another object of this invention is to provide a mixing faucet which employs separate independently operable flexible flap valves formed in a common membrane to open and close the water inlets to the faucet and to seal the operative parts of the faucet to thereby increase the simplicity and effectiveness of the entire valve assemblage and also increase the period of maintenance-free operation.

An additional object of this invention is to provide an improved single lever mixing faucet having valve discs formed in and integral with a flexible membrane, whereby such discs effectively function to seal the water inlets of the faucet without stretching or distorting the valve carrying membrane.

Still another object of this invention is to provide an improved single lever mixing faucet which includes flap type valve discs formed in a flexible membrane and disposed so as to be inherently aided in their closing operation by the pressure of the water from the source of supply, the water pressure thus also inherently aiding in seating and effectively sealing the valves against leakage.

The above and other objects are obtained by providing a single lever mixing faucet which includes a valve body having hot and cold water inlets, a mixing chamber, and an outlet or discharge spout. The faucet additionally includes a flexible membrane spanning the space between the hot and cold water inlets and the mixing chamber and having a pair of flexible flaps integral therewith and forming valve discs which are urged into seated condition to shut off or seal the hot and cold water inlets from the mixing chamber by the pressure of the water existing in the inlet conduits. The valve body also houses actuating means including springs mounted therein in a manner whereby they assist the water pressure existing in the inlet conduits in urging the valve discs into sealing relation with their respective seats. A lever operated cam is positioned in the body so as to coact with motion transmitting means interposed between the cam and valve discs and adapted to selectively swing either one or both of the valve discs away from the respective hot and cold water inlets to permit the water to flow into the mixing chamber and then out of the outlet spout. The flexibly mounted valve discs may thus be actuated to selectively open the hot and/or cold water inlets without disturbing or distorting the membrane in which these valve discs are formed, and each valve disc may furthermore be independently actuated without disturbing the other. A separate sealing means, coacting with the cam seals the operative parts of the valve actuating mechanism from water in the mixing chamber.

The invention, including its construction, function and method of operation, may be better understood by reference to the following specification and drawings, forming a part thereof, in which:

FIGURE 1 is a perspective view of a typical single lever mixing faucet embodying the present invention;

FIGURE 2 is a vertical cross-sectional view of an assembled faucet;

FIGURE 3 is an exploded view of the single lever faucet with some of the parts shown in partial section to reveal details thereof;

FIGURE 4 is a part sectional view of the cam employed in the single lever mixing faucet of the present invention looking at the same in the direction of the arrows 4—4 of FIGURE 3;

FIGURE 5 is a view of the support and guide member for the cam as viewed from the line 5—5 of FIGURE 3;

FIGURE 6 is a plan view of the membrane containing the flapper valve discs taken along the line 6—6 of FIGURE 3;

FIGURE 7 is a fragmentary part sectional view showing the improved single lever mixing faucet in operation; and FIGURE 8 is another cross-sectional view taken along line 8—8 of FIGURE 2 and also showing the improved single lever mixing faucet in operation.

Referring to the drawings, there is shown therein an improved single lever mixing faucet designated by the numeral 9. The faucet consists of a valve body 11 which mounts on the sink, tub, or other support. The valve body 11 includes a sleeve portion 12 which has a single spout 13 projecting therefrom and extending above the sink basin 14 or the like, and a cap 15 is mounted on the top of the sleeve 12. The operation of faucet 9 is controlled by a single lever 17 which is movable about the cap 15.

The lever 17 includes a truncated conical body or shield 10 and an actuating arm 12 projecting laterally therefrom. A cover 14 is shown affixed to flange 16 of the body 10 as by a set screw 18, and this cover 14 protectively shields screws 20 which extend through the top of the lever body 10.

A cam 22 is held captive within the cap 15 of the valve body 11 and this cam is fastened to the conical body portion 10 of the lever 17 by means of the screws 20. Cam 23 may be constructed of a suitable non-corrosive material such as brass or possibly a plastic material such as nylon. The cam is generally spherical in shape and has an upper cylindrical projection 24 to receive the screws 20. One side of the cam 22 is truncated in an inclined plane to form a flattened camming surface 26. Trunnions 28 are mounted at opposite sides of the horizontal diameter of the spherical cam body parallel to the camming surface 26. These trunnions 28 rotatably support the cam 22 inside of the cap 15 and valve body 11 on support members 30 and 32. These support members, which may be constructed of suitable material such as metal or a plastic having good lubricating qualities, rest on a lip or ledge 34 formed in the sleeve 12 of valve body 11. Support member 30 contains diametrically opposed arcuate slots 36 and 38 approximately 90° in length which retain the trunnions 28 and provides tracks therefore which permit the cam 22 to be rotated about a vertical axis for such arcuate length. An index pin 39 which extends through support members 30 and 32, and into the wall of valve body sleeve 12 serves to orient the support members in the valve body.

As shown, the cap 15 is of hemispherical shape and surrounds the upper portion of cam 22. A central aperture 40 is provided in the dome of cap 15 to permit the projection 24 to be joined to lever body 10. An annular plastic or rubber bumper 42 is preferably inserted in the aperture 40 to provide protection to the projection 24 when lever 17 is moved to its extreme positions.

A spring 44 is also compressively mounted in the cap 15 between the upper annular lip or ledge 46 and a seating ring 48. In addition, an annular seal 50 is mounted in the ring 48 and is urged into sealing relation with cam 22 by the action of the compression spring 44. The seal 50 is preferrable shaped to mate with the surface of the cam and prevents water from leaking past the cam 22.

A mixing chamber 54 is formed in the lower portion of the valve body 11 below the cam 22 to combine water admitted from the hot water inlet conduit 56 and the cold water inlet conduit 58 before it is discharged through the outlet 60 in the spout 13. To form the chamber 54, the valve body 11 is provided with a bottom wall 62 having spaced apertures 56, 58 forming ports communicating with the hot and cold water inlet conduits.

The valve body 11 also includes a retainer and adapter 64 attached to the sleeve portion 12 thereof as by means of screws 66. This retainer and adapter 64 contains an annular recess or depression 67 adjacent and upwardly open to the bottom wall 62 of the valve body 11 to receive a flexible membrane 68. This membrane 68 may be a flexible plastic or rubber material and contains two flexibly attached flaps forming circular valve discs 70 and 72 shown as being formed integral with the membranes as by means of arcuate slots 74 and 76. As may be seen from FIGURE 6 the arcuate slots 74, 76 circumscribe the valve discs except for small hinge portions 75, 77 respectively. It will be appreciated that the diameter of the flaps or valve discs 70, 72 must be greater than the diameter of the hot and cold water inlet ports 56, 58 so that the valve discs may seat against the wall 62 and seal on their respective seats surrounding the inlet ports.

Mounted in the center of each of the valve discs 70, 72 is a motion transmitting or actuating rod 78, 79 respectively, each of which extends through the respective hot and cold water inlet ports and into coacting relation with the surface 26 of cam 22. As shown, these rods 78, 79 may each be formed with a head embedded, as by molding, directly within the respective discs 70, 72. The valve discs 70, 72 are urged toward their seated positions against the wall 62 to seal the inlet ports as by springs 80, 81 mounted in upwardly open recess or sockets 82, 83 respectively formed in the body 64. The hot water pipe 84 and cold water pipe 86 connect with sockets 82, 83 respectively and the pressure of the water in the supply pipes and sockets assists springs 80, 81 in seating the valve discs 70, 72 on the hot and cold water inlet valve seats surrounding the ports 56, 58.

The valve retainer and adapter 64 is threaded on its exterior to accommodate a washer 88 and a nut 90 which secure the valve 9 to the sink.

Thus, to close both flap valve 70, 72, the lever arm 12 is centered on the valve body 11 and is swung downwardly, as shown in FIGURES 1 and 2, thereby pivoting cam 22 on trunnions 28 until the camming surface 26 barely maintains, or loses contact, with the push rods 78, 79. This permits the springs 80, 81, augmented by the pressure of the water in sockets 82, 83 to urge the valve discs 70, 72 toward and against their valve seats surrounding the hot and cold water inlet ports 56, 58, thereby sealing the inlet ports and preventing water from flowing into mixing chamber 54 and out of the spout 13.

To open both the hot and cold water inlets, lever arm 12 is maintained centered on the valve body 11 and is raised, as shown in FIGURE 7. This rotates the attached cam 22 downwardly on trunnions 28 to bring the camming surface 26 into contact with the push rods 78, 79. Camming surface 26 thus tilts the upper end of push rods 78, 79 and causes the valve discs 70, 72 to be swung downward about their hinge portions 75, 77 and off of their respective valve seats to open the inlet ports 56, 58. Water is thereby permitted to flow through pipes 84, 85, sockets 82, 83, the hot and cold water inlet ports 56, 58, and into mixing chamber 54 as shown by the arrows in FIGURE 7. The commingled tempered water in the chamber 54 then passes through the outlet 60 and spout 13. The volume of flow is, of course, determined by the extent to which the lever arm 12 is raised since this determines the amount of tilting accorded to the motion transmitting rods 78, 79 and the corresponding downward swinging movement of valve discs 70, 72. Seal 50 surrounding cam 22 prevents the water in the mixing chamber 54 from leaking into the other operative parts of valve 9.

To open only one of the water inlets, the lever arm 12 is horizontally rotated about its vertical axis to either the left or right of the center position as far as possible and raised. In FIGURE 8 which is a rear cross-sectional view of faucet 9, the lever arm 12 has been rotated clockwise. This rotation is permitted by reason of the grooves 36 and 38 in support member 30 which confine the trunnions 28. When the lever arm 12 is then raised, only the actuating rod carried by the valve disc 70 will be tilted by downward movement of camming surface 26, thereby opening only the associated inlet 58. The push-rod 79 carried by the valve disc 72 will be out of contact with cam surface 26 and remains unaffected by its motion. Thus only supply water from inlet port 58 and pipe 86 will flow into the mixing chamber 54 and out of the spout 13. Inlet 58 may then be closed by lowering lever arm 12.

If lever arm 12 is rotated in the opposite direction, inlet port 56 will be opened when the lever arm is raised thus admitting water from that inlet only to the mixing chamber 54. It will be appreciated, that by rotating lever arm 12 left or right to only partially open one or the other of the valves 70, 72, an amount less than maximum from either or both the hot and cold water inlets will be supplied to mixing chamber 54, thus selectively changing the temperature of the water issuing from spout 13. Further, by the proper connection of hot and cold water pipes 84 and 86 as shown in FIGURE 8, movement of lever arm 12 clockwise will cause hotter water to flow from spout 13 while movement of lever arm 12 to the right will cause colder water to flow from the spout. This is in accordance with conventional plumbing practice in which the hot water control is on the left and the cold water control on the right.

It will be readily understood from the foregoing that the improved single lever mixing faucet of the present invention minimizes distortion, stretching and excessive wear encountered in the past by providing independently swingable valve discs which are flexibly connected to a common membrane member by a hinge portion. This permits either or both of the valve discs to seal or open the water inlets with a minimal effect on the remainder of the membrane member. Further, the water pressure in the inlet supply pipes to the faucet assists in sealing the valve discs against the valvet seats of the faucet. This also prevents deterioration of the valve forming membrane member as it need not be forced toward the valve seat, against the pressure of the incoming water, by mechanical means. The operative parts of the valve are sealed by a sealing member surrounding the cam which effectively prevents water from getting into these parts. The use of a separate sealing means for the operative parts of the valve and for the water inlets promotes long life of the means used to accomplish these functions resulting in a faucet having minimal maintenance requirements.

Various modes of carrying out the invention are contemplated as being within the scope of the following claims particularly pointing out and distinctly claiming the subject matter which is regarded as the invention.

We claim:

1. A single lever faucet comprising, a valve body having a plurality of inlet ports formed therein and communicating on one side thereof with a mixing chamber and on the other side with fluid supply lines, a discharge spout having a conduit communicating with said mixing chamber, a flexible membrane mounted on said valve body and having a plurality of flexible valve discs hinged thereto and each spanning one of said inlet ports, an actuating lever carried by said body, and means interposed between said lever and said valve discs for transmitting motion from said lever to said valve discs to selectively swing said discs to admit supply water from selected ones of said supply lines through the respective ports and into said mixing chamber for discharge therefrom through said spout.

2. A single lever faucet according to claim 1, wherein the valve discs are formed integral with the membrane by arcuate slots in said membrane, the ends of each slot terminating short of each other to thereby define a hinged portion uniting the respective valve discs to the membrane.

3. A single lever faucet according to claim 1, wherein the inlet ports are formed in a wall of the mixing chamber and the flexible membrane is mounted on the exterior of said ported wall so that the valve discs are urged toward seated position on said wall by the pressure of the water in the fluid supply lines.

4. A single lever faucet according to claim 1, wherein the flexible valve discs are constantly urged toward seated condition to close the inlet ports by compression springs.

5. A single lever faucet according to claim 1, wherein the means for transmitting motion from the lever to the valve discs includes a cam and a motion transmitting rod carried by each of the valve discs and movable by said cam to selectively swing said discs.

6. A single lever faucet according to claim 3, wherein the valve body includes an adapter having recesses, each open on one side to a supply line and on another side to one of the valve discs.

7. A single lever faucet according to claim 5, wherein the motion transmitting rods each have a head embedded in their respective valve discs and spring means is provided for opposing motion of said discs by their respective rods.

8. A single lever faucet according to claim 5, wherein the lever includes a conical body seated on the valve body and the cam is secured to said conical body for movement therewith.

9. A single lever faucet according to claim 5, wherein the cam is secured to the lever and is provided with an inclined actuating surface and with means for permitting rotation of the cam about both a vertical and a horizontal axis.

10. A single lever faucet according to claim 9, wherein means are provided for constantly urging the cam downwardly under spring pressure and means are further provided for sealing the periphery of the cam between the mixing chamber and the spring means.

References Cited

UNITED STATES PATENTS

| | | | |
|---|---|---|---|
| 1,879,205 | 9/1932 | Gunn | 251—303 X |
| 2,297,994 | 10/1942 | Vellinga | 251—303 X |
| 2,497,558 | 2/1950 | Reeves | 137—636.2 |
| 2,519,448 | 8/1950 | Fairchild | 137—636.1 |
| 3,155,115 | 11/1964 | Zeigler | 137—636.4 |

CLARENCE R. GORDON, *Primary Examiner.*